Figure 1:
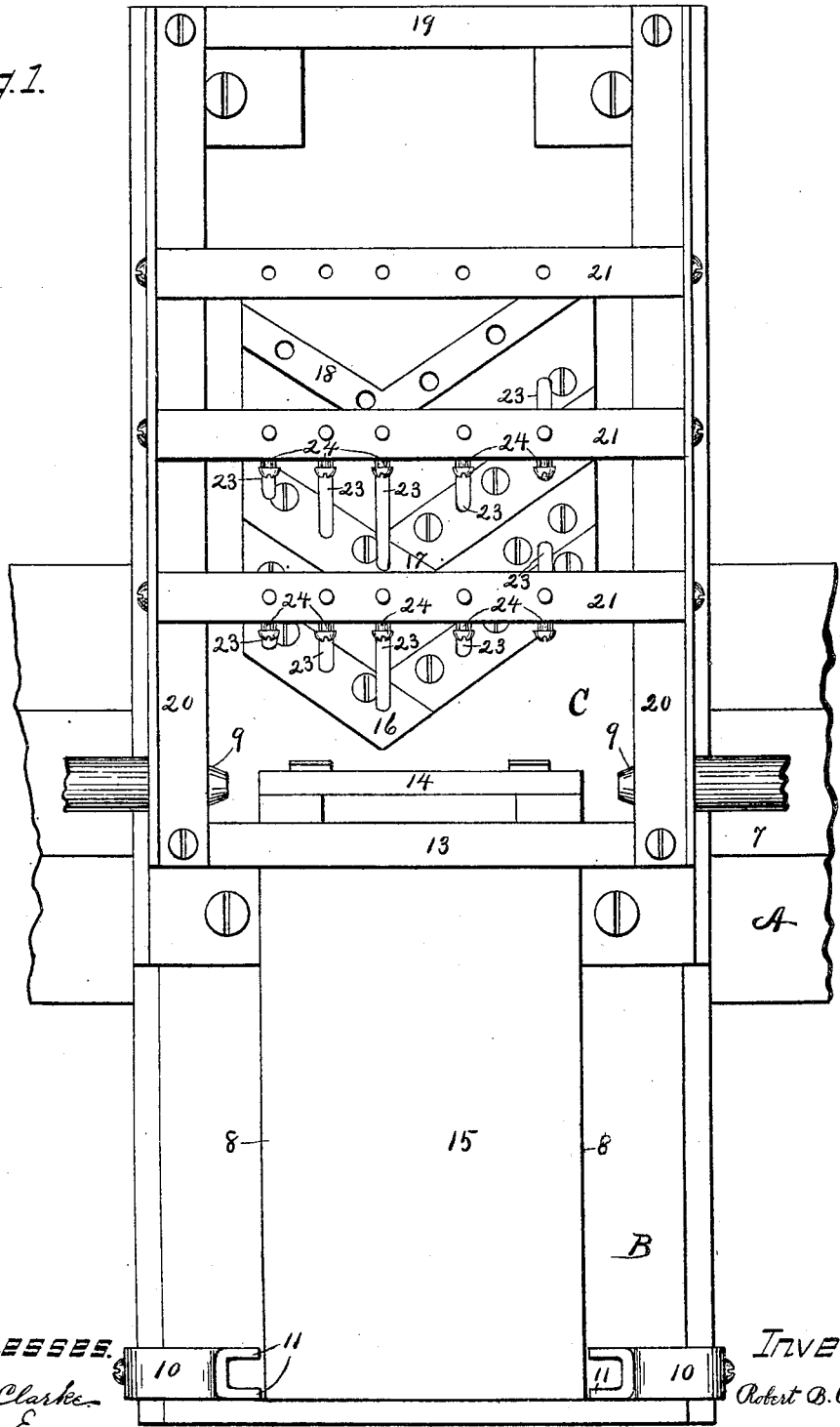

No. 800,631. PATENTED OCT. 3, 1905.
R. B. CODLING.
ATTACHMENT FOR WOOD TURNING LATHES.
APPLICATION FILED OCT. 10, 1904.

2 SHEETS—SHEET 1.

Witnesses.
S. H. Clarke
P. J. Egan

Inventor.
Robert B. Codling.
By James Shepard.
Atty.

No. 800,631. PATENTED OCT. 3, 1905.
R. B. CODLING.
ATTACHMENT FOR WOOD TURNING LATHES.
APPLICATION FILED OCT. 10, 1904.
2 SHEETS—SHEET 2.
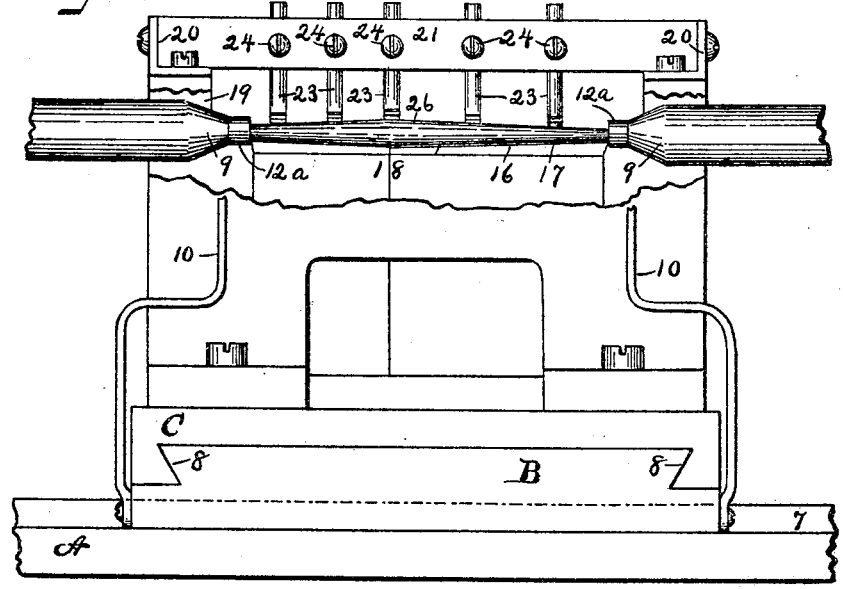
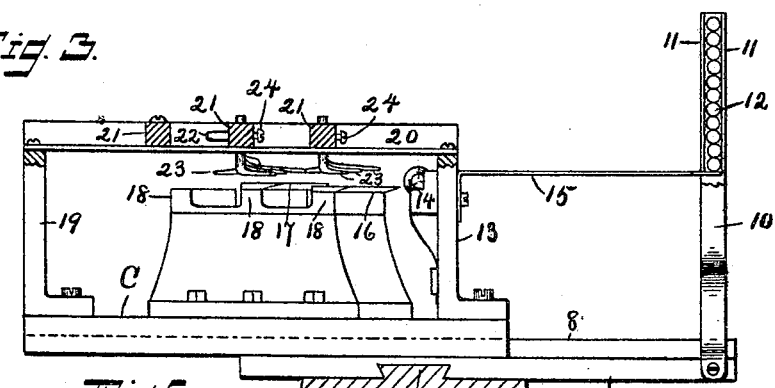
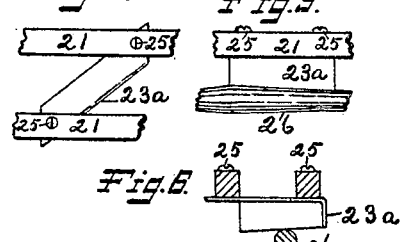
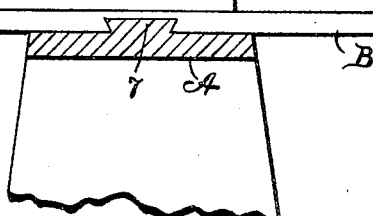
Witnesses.
S. H. Clarke.
P. J. Egan.
Inventor.
Robert B. Codling.
By James Shepard.
Atty.

UNITED STATES PATENT OFFICE.

ROBERT B. CODLING, OF BRISTOL, CONNECTICUT.

ATTACHMENT FOR WOOD-TURNING LATHES.

No. 800,631.    Specification of Letters Patent.    Patented Oct. 3, 1905.

Application filed October 10, 1904. Serial No. 227,768.

*To all whom it may concern:*

Be it known that I, ROBERT B. CODLING, a citizen of the United States, residing at Bristol, in the county of Hartford and State of Connecticut, have invented certain new and useful Improvements in Attachments for Wood-Turning Lathes, of which the following is a specification.

My invention relates to improvements in an attachment for wood-turning lathes; and the object of my improvement is to provide a steadying-rest to prevent long and slender articles from chattering when being turned.

In the accompanying drawings, Figure 1 is a plan view of my attachment and a sufficient portion of a lathe to show its connection therewith. Fig. 2 is a broken-out front elevation of the same, together with a piece of work such as the machine is arranged to turn. Fig. 3 is a sectional side elevation, on a smaller scale, the work having been removed. Fig. 4 is a plan view of a portion of the cross-bars with a rest of a different form secured thereto. Fig. 5 is a front elevation of the same, together with a portion of an article such as the said rest is adapted to work against. Fig. 6 is a sectional side elevation of the same.

A designates a portion of the bed of an ordinary or old form of lathe having longitudinal ways 7, upon which other parts may be adjusted longitudinally of the said ways and secured at any desired position thereon. The carriage-bed B is mounted on these ways 7 and in turn is provided with ways 8, upon which the carriage C is mounted to slide longitudinally of the carriage-bed and transversely to the lathe-bed and axis of the lathe-centers 9 9, the ends of which centers are shown in their proper position.

Upon the carriage-bed is fixed the hopper, composed of two uprights 10, having confronting flanges 11 at their upper ends, which together form the hopper or vertical chute, in which a number of square or round blanks 12, Fig. 3, may be stacked one upon the other. Mounted on the front end of the carriage C is a bracket 13, having a blank-holder 14 and apron 15. The said apron when the carriage is moved back to the rear end of its stroke extends substantially from the under side of the hopper to the said blank-holder, while the said holder at the forward stroke of the carriage is brought directly under the hopper to receive a blank into the holder in the well-known manner of similar hoppers and carriages in prior machines. This blank-holder is at the proper height on the carriage to present a blank between the lathe-centers, as shown in Figs. 2 and 3. Back of the blank-holder on the carriage there are three knife or chisel seats 18 and two chisels 16 17, each of which comes to a point in front within the middle portion. The rear chisel 17 is set a little higher than the front chisel 16, so as to turn off a portion of the work after the work has been subjected to the front chisel. The third or rear chisel-seat can also have a chisel applied thereto, if desired. Any ordinary means may be employed to reciprocate the carriage from front to rear and to drive one or both of the lathe-centers.

A lathe with parts similar to those thus far described is old and well known, although the particular construction of some of these parts is new with me. My present invention relates to the attachments whereby I support the work against trembling when being turned. It is particularly adapted for turning various kinds of long slender articles. I have selected for illustration a penholder. At the rear end of the carriage is another bracket 19, similar to the bracket 13. Extending from bracket to bracket at each side longitudinally of the carriage I arrange what may be called the "side rails" 20 of the rest-support and transversely thereto the cross-bars 21 of the rest-supports. These can be secured in any desired position and in any proper manner—as, for example, by screws, as shown. The side rails 20 are in the form of angle-irons, and the cross-bars rest on one blade or member of the said angle-irons, while the end of the cross-bars abut against the other member thereof, the holding-screws passing through the said member into a threaded hole in the ends of the cross-bars. The side rails may be provided with a longitudinal slot 22 for the holding-screws to pass through, as shown, for the middle one of the cross-bars 21, Fig. 3, whereby they may be adjusted forwardly or rearwardly, as may be desired. The cross-bars may be perforated to form as many vertical sockets as desired for receiving the shanks of the steady-rests 23 and with set-screws 24 for securing the said rests in the desired position after having been adjusted within the said sockets. These rests may not only be adjusted vertically, but they can be turned so as to present their horizontal arms, the active part of the rests, into any desired position, so that the said arm projects forwardly or rearwardly from the shank in a direction parallel to the carriage or obliquely thereto, as may be desired.

Of course the chisels are shaped to conform to the contour of the work to be turned. As shown, these chisels are arranged for undercutting—that is to say, they pass under the work being turned and are fed in a direction transversely to the axis of the work. The steady-rests are arranged in opposition to the chisels, so as to follow them on the opposite side of the work, and like, the chisels, are disposed so as to conform as nearly as possible to the contour of the work turned by the respective chisels. They are therefore so set that the forward end of their bearing or active arm lies a little back of the adjacent forward edge of the chisel.

In Fig. 2 I have shown a penholder such as will be produced by the lathe when its cutters and rests are arranged as shown. The original ends of the blank 12 are designated as $12^a$, and the intermediate portion 26 is that which has been turned by the lathe, the length of the turned portion between the said ends $12^a$ being determined by the width of the chisel measured transversely to the carriage. After a blank has been presented to the lathe-centers and taken hold of by the said centers the carriage is moved toward the front to carry the cutters under the revolving blank in the said lathe-centers. The forward nose or point of the first chisel or cutter soon comes under the blank and turns the middle portion thereof or the part having the greatest diameter, and then as the chisel slants backwardly on both sides the cutting is gradually toward each end from the starting-point. With the rests arranged as shown, the rest immediately to the rear of the starting-point soon bears on the work as turned by the nose of the chisel, and thus supports the work by steadying it as the turning proceeds until the portion in front of the next succeeding rest or rests has been turned, and these rests in like manner engage the work to steady it in the same way until the first set of rests and first chisel are passed, and then the second chisel and second rest act in like manner, whereby the work is or may be supported at points adjacent to the points where the chisels are cutting until the complete article has been turned. At the limit of the forward movement of the carriage the centers may be withdrawn and the work discharged therefrom ready for the carriage to move back and present another blank to the lathe-centers for a repetition of the operation before described.

In order to more clearly show that the specific construction of the rests is immaterial and may be varied at pleasure even with a given form of work, I have illustrated in Figs. 4, 5, and 6 a substitute for the three right-hand rests of Figs. 1, 2, and 3. This substitute is in the form of a single blade $23^a$, which depends from the cross-bars 21 in an oblique direction and with its edge shaped in front view, according to the contour of the work over which it is to travel. For convenience of attaching it to the cross-bars by screws 25 this blade $23^a$ is formed of the vertical member of an angle-iron, while the horizontal member of the said angle-iron receives the holding-screws. The operation of this rest is substantially the same as that of the rests before described, excepting that it travels over substantially the whole of the length of that portion of the work which is supported thereby instead of traveling only over several points within that length.

While the form of the rests is not essential, it is best to employ substantially rigid rests or at least those that are so rigid as not to yield perceptibly under the working strain. If the active part—that is, the part that bears upon the turned work—is of considerable length, it is best to arrange it at an angle to the longitudinal movement of the carriage, so that it does not bear upon one place for so long a time as to produce a high-degree heat. The particular form of the supports for the rests is not essential, the specific supports shown being nothing but an example of a convenient form.

Under the term "chisel" as herein used I intend to include any form of cutting-tool that may be applied to the carriage for turning the work. The essential feature of the invention resides in cutting or turning tools shaped according to the contour of the work to be turned and arranged on a carriage to move transversely to the axis of the work and to pass by the work on one side thereof, with one or more steady-rests arranged on the same carriage and disposed with reference to the contour of the work for acting successively at different points in the length of the said work and to pass by the said work on that side which is opposite the said cutting or turning tools.

While only one rest may sometimes be sufficient, it will be generally best to employ more, and in this connection I wish to state that a single blade set at an angle to the line of movement of the carriage, as in Figs. 4, 5, and 6, is, in effect, a series of rests that act on the work at successively different points in its length.

I am aware that steady-rests have been heretofore employed in turning-lathes when the turning-tool moved parallel to the axis of the lathe-centers and the said rest following the tool moved in the same direction, and I hereby disclaim the same.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. In a lathe, the combination of a carriage arranged to move transversely to the axis of the lathe-centers with chisels mounted thereon and shaped to correspond with the work to be turned, a rest-support mounted on the said carriage to move with the said chisels, a series of steady-rests mounted in the said rest-support to act on the work in opposition to the said chisels, and means for adjusting the said steady-rests in the said support to conform to the contour of the work.

2. In a lathe, the combination of a carriage arranged to move transversely to the axis of the lathe-centers with a chisel mounted on the said carriage, and a series of opposing steady-rests mounted on the said carriage and arranged for acting successively at different points in the length of the work.

3. In a lathe, the combination of a carriage arranged to move transversely to the axis of the lathe-centers, with turning-chisels mounted on the said carriage, and steady-rests also mounted on the said carriage and adapted to pass the work on one side while the turning-chisels are acting on and passing the other side of the work.

4. In a lathe, the combination of a carriage, with cutting-chisels mounted on the said carriage, and arranged to pass the lathe-centers in a transverse direction to their axis and at one side of the said axis, and steady-rests disposed according to the contour of the work turned by the said chisels, and arranged to pass the lathe-centers in a transverse direction on the other side of their axis simultaneously with the passage of the said chisels.

5. In a lathe, the combination of a carriage arranged to move transversely to the axis of the lathe-centers, with turning-chisels mounted on the said carriage to pass by the said lathe-centers at one side thereof, the said chisels being set obliquely to the line of movement of the said carriage to act progressively on the work in the said lathe-centers, and a series of steady-rests mounted on the said carriage and moving with the cutters of the said carriage, the said rests being arranged obliquely to the line of movement of the said carriage to follow the action of the said chisels and act in opposition thereto at successively different points in the length of the work.

ROBERT B. CODLING.

Witnesses:
SAMUEL DRIVER, Jr.,
GEO. ROY.